Feb. 28, 1939.　　　　　G. W. GAIL　　　　2,149,167
BED
Filed Sept. 6, 1935　　6 Sheets-Sheet 1

Feb. 28, 1939.　　　　　G. W. GAIL　　　　　2,149,167
BED
Filed Sept. 6, 1935　　　6 Sheets-Sheet 4
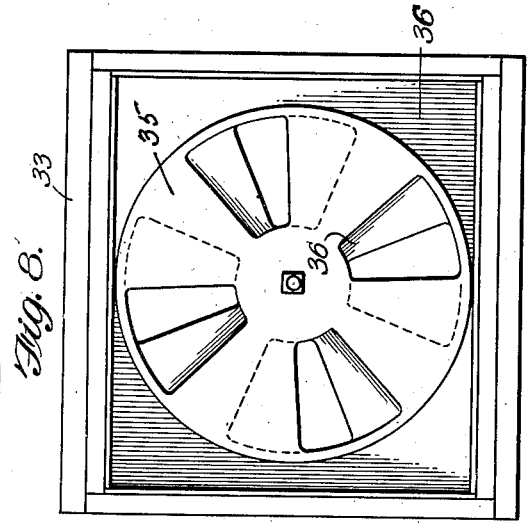
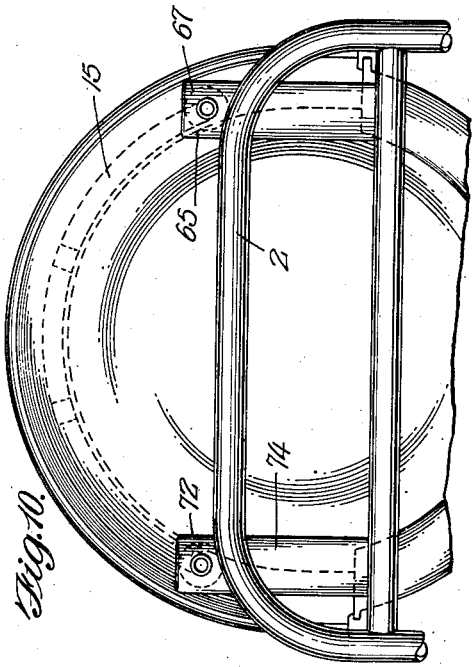
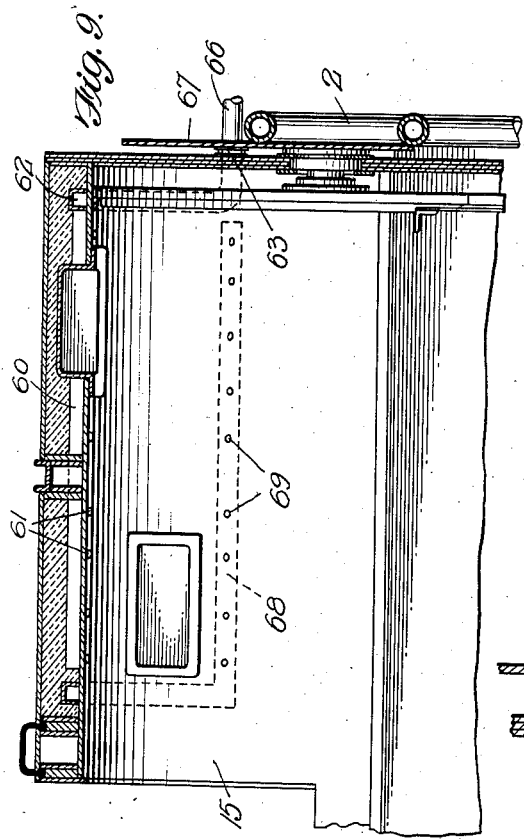
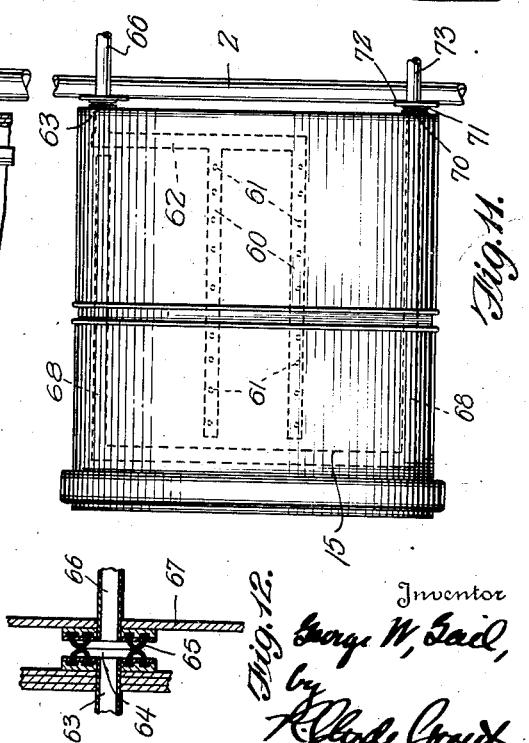
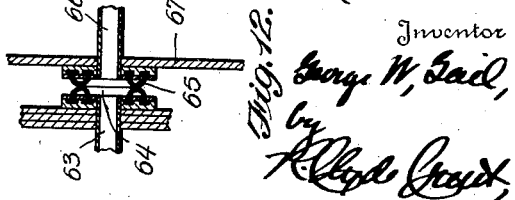

Feb. 28, 1939.　　　　G. W. GAIL　　　2,149,167
BED
Filed Sept. 6, 1935　　　6 Sheets-Sheet 5

Inventor
George W. Gail,
by R. Clyde Grout,
Attorney

Feb. 28, 1939.  G. W. GAIL  2,149,167
BED
Filed Sept. 6, 1935  6 Sheets-Sheet 6
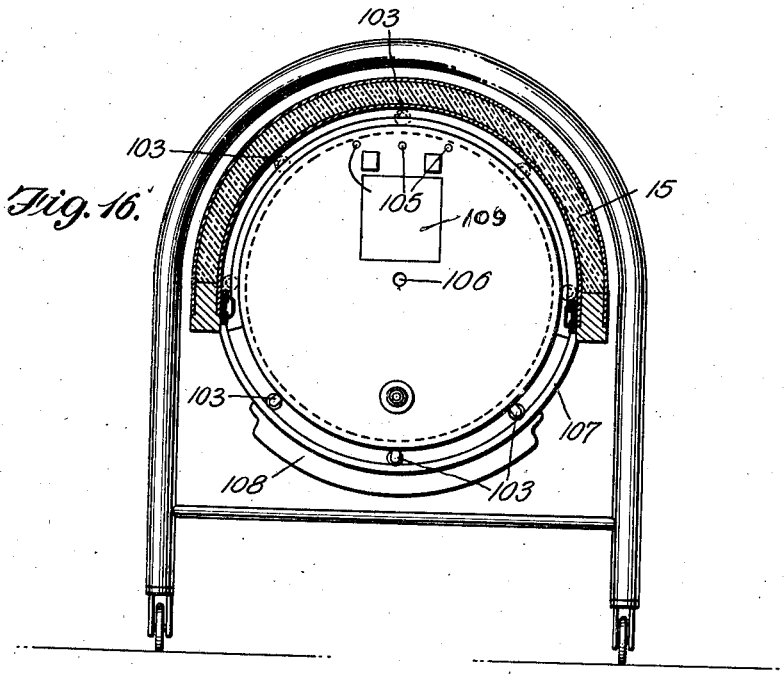
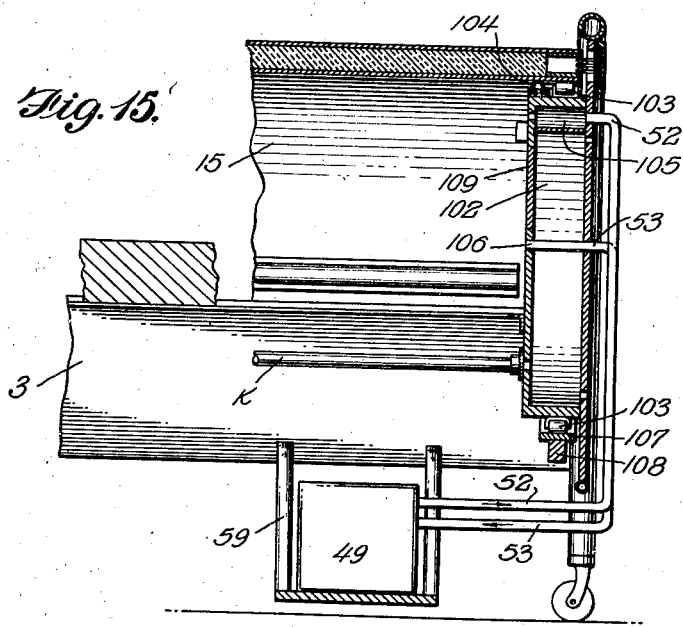
Inventor
George W. Gail,
By Clark Grant,
Attorney Patented Feb. 28, 1939

2,149,167

UNITED STATES PATENT OFFICE 2,149,167

BED

George W. Gail, Ruxton, Md.

Application September 6, 1935, Serial No. 39,475

5 Claims. (Cl. 5—334)

This invention relates to beds and the like and particularly to certain novel improved features of construction and design of the type of bed as disclosed in applicant's prior Patents 1,980,516 and 1,995,205 and application filed June 5, 1934, Ser. No. 729,140, the present invention being the result of continuous and active development in this art, whereby the bed is adaptable to air conditioning as well as air heating.

The fundamental idea in all of these constructions is the production of a bed wherein the occupant's body is enclosed and the temperature within the enclosure automatically regulated and maintained constant as desired and thereby eliminating bed clothing and permitting more restful repose and free movements of the individual.

These prior constructions all permitted easy access to the bed either by hinged portions or a rotary portion, cooperating with a sliding portion, the latter arrangement as in the present design being the later developments. They also provided automatic means for regulating the temperature within the enclosure.

The object of the present invention is to produce a bed embodying all of these features in a more efficient and improved manner and at the same time greatly improve the general appearance, operation and construction of the bed as a whole.

A further object is the production of a bed of the type indicated not only provided with means for heating the enclosure but in addition, constructed to provide for the cooling and conditioning of the air within the enclosure in which latter event, means are provided for enclosing the head as well as the body of the individual.

More specifically, the object of the invention is the provision of an enclosed bed construction wherein the means for admitting and exhausting air from the enclosure are incorporated in the bed structure in a novel manner without in any manner interfering with the normal movements of the bed parts in operation, the bed being so constructed and arranged as to have incorporated therewith the various automatically operated and controlled electric devices for the heating and air conditioning apparatus.

The preferred embodiment of the invention is illustrated in the accompanying drawings, in which—

Figure 4 is an enlarged detail plan view, partly in section, of the wiper switch construction for the automatic electric control;

Figure 5 is an enlarged detail view in elevation of that part of the switch carried by the rotatable portion of the bed;

Figure 8 is an enlarged plan view thereof;

Figure 9 is a modification illustrating another means of admitting and exhausting air to and from the rotary enclosure;

Figure 10 is a rear end view thereof;

Figure 11 is a plan view somewhat reduced of this modified construction;

Figure 12 is an enlarged detail view of the air connection and seal between the rotatable enclosure and the stationary foot portion of the bed employed in this modified construction;

Figure 15 is a longitudinal sectional view illustrating a further modification of the rear end enclosure construction wherein the foot board and foot panel are combined in one and the air admitted and exhausted through this combined unit; and Figure 16 is a transverse sectional view thereof.

Figure 1:
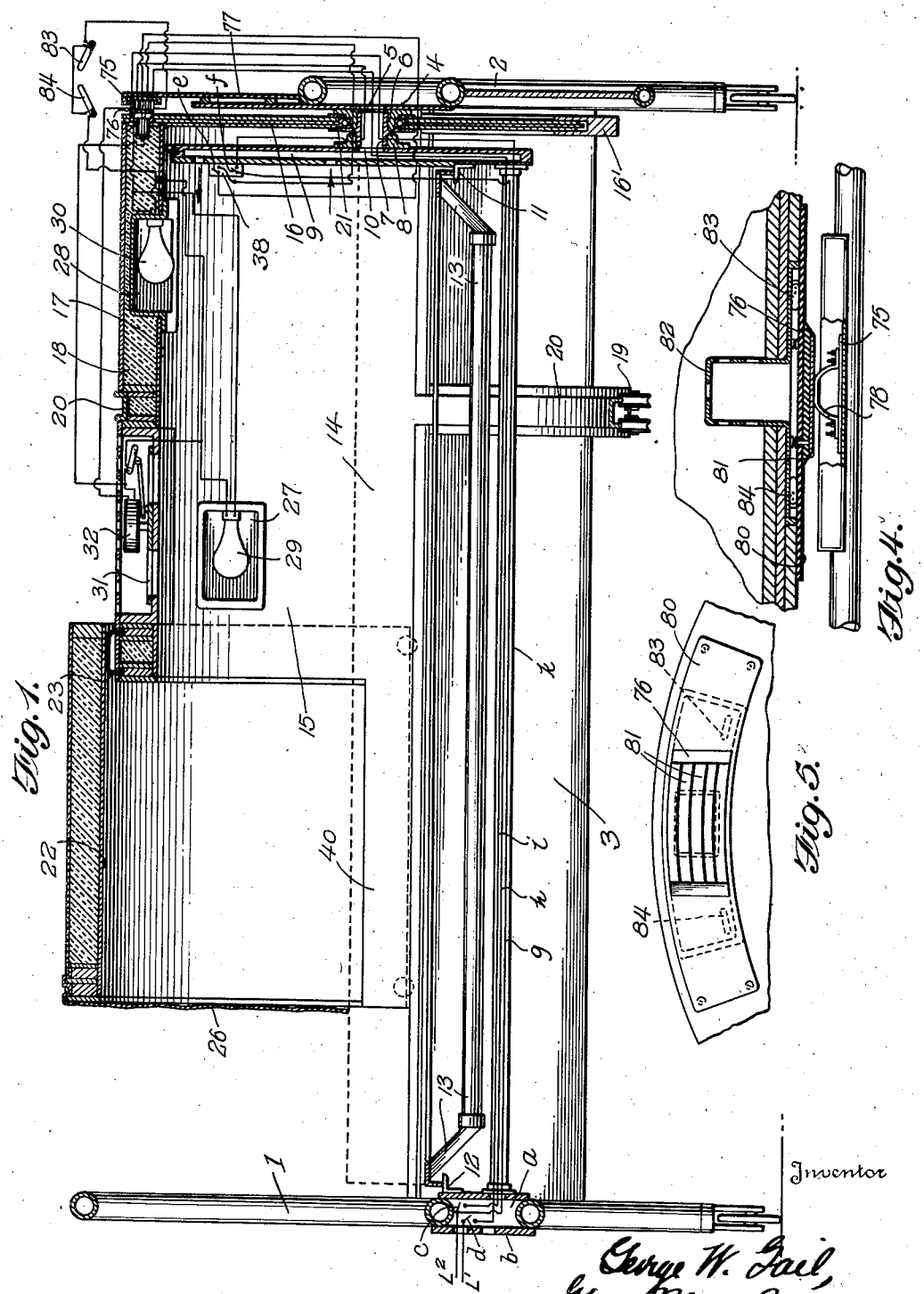
Figure 1 is a vertical sectional view of the improved bed construction.

Referring to the drawings in detail, and with particular reference to Figure 1, the improved bed construction comprises a main bed frame consisting of a head 1, a foot 2 and side rails 3.

Secured to the foot 2 of the main frame is a plate or the like 4 provided with an opening 5 and around this opening 5 is secured a threaded pipe flange or similar member 6. Threaded into this pipe flange 6 is a short pipe section or nipple 7 having threaded on its opposite end a threaded annular flange member 8. Rigidly secured to this annular flange 8 is a hollow stationary foot board 9, said foot board being provided with an opening 10 adapted to register with the opening in the nipple 7 and the opening 5 in the plate 4 whereby open communication will be had between these parts for the purposes to be hereinafter described.

Carried by the lower inner face of the stationary foot board 9 are brackets 11 (see Fig. 3) and similar brackets 12 are secured to the head 1 of the main frame. Supported upon these brackets 11 and 12 is a bed spring frame 13 carrying a mattress 14.

Rotatable about these parts is a semi-cylindrical housing 15 open at its forward end, but closed at its rear end by a foot panel 16 preferably made of laminated board or the like. The curved wall 17 of this housing is preferably made hollow and filled with insulating material 18 of any well known type. This housing 15 when in operative position, is adapted to enclose a major portion of the mattress 14 and is mounted for rotation upon a roller supporting band 19, the said housing being provided with an annular channel-shaped track 20 positioned around the outer circumference of the housing to engage the said band 19 as clearly shown in Figures 1, 2 and 3.

Figure 2:
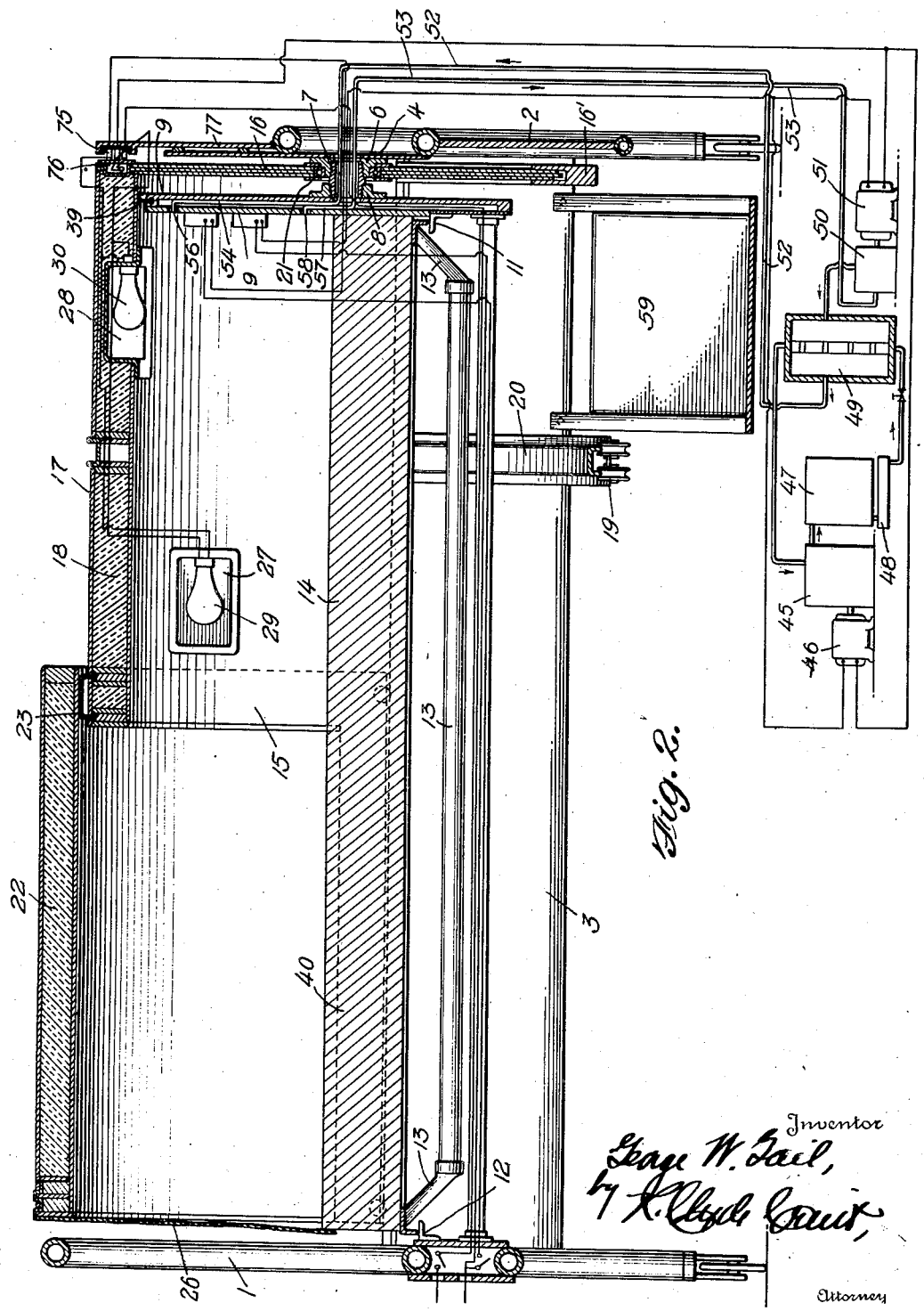
Figure 2 is a similar view including an air conditioning unit.

The rear end of the housing is concentrically supported by the pipe section or nipple 7 upon antifrictional bearings 21 interposed between said pipe section and a circular opening provided in the foot panel 16 as clearly shown in Figures 1 and 2.

Secured to the lower edge of the foot panel 16 of the rotary member 15, and extending substantially around the lower half thereof, is a counterbalance weight 16', (Figures 1, 2 and 3) whereby said rotary member 15 may be manipulated with the least possible effort in the operation of the device.

Associated with the rotary housing 15 is a telescoping sliding section 22, a sealing member 23 being interposed between these parts in order to insure an airtight joint in all positions and movements of these rotary and sliding members 15 and 22.

The lower longitudinal edges of the sliding member 22 are provided with rollers 24 engaging horizontal tracks 25 secured to the upper edges of both of the side rails 3 of the main bed frame.

The forward end of the sliding member 22 is provided with a curtain or the like 26 so that in the extreme forward position of the sliding member 22 the entire bed is enclosed, provided of course the rotary member is in its operative position as shown in Figure 2. When the body only of the occupant is to be enclosed, leaving the head exposed, the sliding member 22 is not carried to the head of the bed, or a shorter member 22 may be provided as shown in Figure 1.

Figure 7:
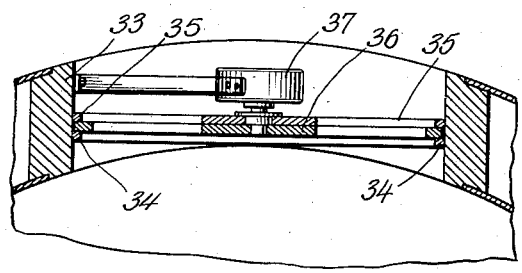
Figure 7 is an enlarged transverse vertical sectional view of the automatic air vent mounted in the rotatable portion of the bed.

Referring to Figure 1, the walls of the rotary member 15 are provided with recesses 27 and 28 in which are mounted heat lamps 29 and 30, these lamps being automatically controlled and operated through an electric circuit to be hereinafter described. There is also provided in the wall of the rotary member, at the top, another recess to receive an air ventilator 31 and its operating motor 32, clearly shown in detail in Figures 7 and 8, the same being assembled as a unit and thereafter inserted and secured in the recess provided therefor. This ventilator unit comprises a main frame 33, a supplemental frame 34, a rotatable valve member 35 and a cooperating stationary valve member 36. The rotatable valve member 35 is secured to the shaft of a small electric motor 37, the said motor being supported by a bracket or the like as clearly shown in Figure 7, and adapted to be operated and controlled through the electric circuit above referred to, in a manner to be hereinafter described.

As hereinbefore stated the stationary foot board 9 is made hollow for the two-fold purpose of admitting and exhausting air to and from the air conditioning apparatus (Figure 2) to be more fully described and also for the purpose of concealing the electric wires running to the double thermostat 38. In the drawings this wiring is shown diagrammatically for clearness but in the actual construction will be concealed within the foot board 9.

Figure 3:
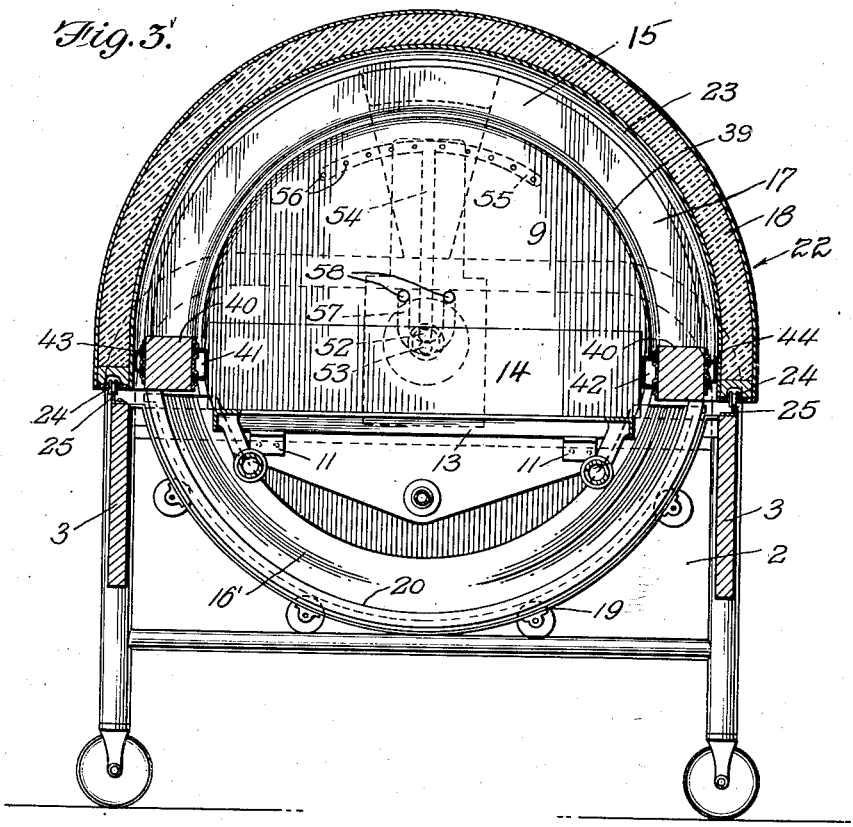
Figure 3 is a transverse sectional view.

Interposed between the outer edge of the stationary foot board 9 and the inner face of the rotary member 15 is an airtight seal 39. Reference has already been made to the seal 23 between the rotary member 15 and the sliding member 22 and in order to complete the airtight sealing of the enclosure, the lower edges of the rotary member 15 are extended to form rails 40 continuous from the head to the foot of the bed, (Figures 1, 2 and 3). These rails (Figure 3) are provided on their inner face with seals 41 and 42 engaging the mattress 14 and the outer faces of said rails are provided with seals 43 and 44 engaging the lower inner edge of the sliding member 22.

All of these seals are of the type as disclosed in applicant's Patent 1,991,776 and application Ser. No. 20,499 and with the arrangement as described the interior of the bed enclosure will be substantially airtight.

The construction as illustrated in Figure 2 is substantially the same as that shown in Figure 1 except for certain minor changes necessary to adapt the bed to air conditioning. In this figure an air conditioning apparatus is diagrammatically shown comprising a compressor 45 driven by an electric motor 46, a condenser 47, receiver 48 and an evaporator 49 forming the usual electric refrigeration cycle. Through the evaporator chamber 49 the air to and from the bed enclosure is circulated by a blower or the like 50 driven by an electric motor 51, the air inlet and outlet pipes being shown as 52 and 53 respectively.

These pipes enter the enclosure through the nipple 7 and extend into the hollow foot board 9. The inlet 52 is connected to a T-shaped pipe 54 (see Figure 3) positioned in the upper part of the hollow foot board, the head 55 of the T-shaped pipe 54 being provided with outlet openings 56. The outlet pipe 53 is connected to a U-shaped pipe 57 positioned within and near the center of the hollow foot board 9, the ends of the U-shaped pipe providing the outlet openings 58.

As hereinbefore stated the air conditioning apparatus, for the purpose of clearness in illustration is merely illustrated diagrammatically but in the actual commercial installation, all of this apparatus will be positioned and arranged in one or more containers such as 59 supported from beneath the bed proper so that the bed can be moved as a unit without disturbing any of the connections.

It will be noted that in the construction as shown in Figure 2, the sliding member 22 of the bed, extends nearly to the head 1 of the main frame of the bed so that the occupant's head as well as the body is enclosed, which of course would be necessary to obtain full benefits of the cooled or conditioned air. It will also be noted that in this construction the air vent 31 will be omitted or disconnected, the same being unnecessary when air conditioning is used.

Referring to Figures 9, 10 and 11, a modification of the air admitting and exhausting means for the air conditioning apparatus is shown in which these inlets and outlets are located in the rotary member 15 and not in the stationary foot board 9 as shown in Figures 1 and 2 and in some instances this method of admitting and exhausting of the air may be preferred especially where it is desired to use large ducts at low pressure. In the construction as illustrated in Figures 1 and 2 the ducts would necessarily have to be small in order for both of them to pass through the nipple or axle 7.

In this modified construction there is positioned within the walls of the rotary member 15, and at the top thereof, a pair of air inlet pipes 60 provided with openings 61, said pipes being connected to a common pipe or conduit 62 extending to one side of the rotary member and out through the rear end thereof at 63. The extreme outer end of this extension 63 (see Figure 12) is provided with an annular seal 64 adapted to have a frictional airtight connection with a cooperating annular seal seat 65 carried by the end of a pipe 66, supported by a plate or the like 67 secured to one side of the foot 2 of the main frame of the bed (Fig. 10). The pipe 66 corresponds to the inlet pipe 52 running from the air conditioning apparatus as shown in Fig. 2. Also mounted within the walls of the rotary member 15 is an approximately U shaped pipe or conduit 68, the two legs of the U being positioned along the intermediate portion of the sides of the rotary member 15 and provided with outlet openings 69. This air outlet or exhaust pipe 68 similar to the inlet pipe is provided with an outlet 70, which outlet is in turn provided with an air seal 71 adapted to engage a like air seal 72 carried by an outlet pipe 73 running back to the air conditioning apparatus which pipe 73 corresponds to the air outlet pipe 53 as shown in Figure 2.

This air seal 71 and 72 is the same as that shown at 64 and 65 in Figure 12, and like the air seal 65, the air seal 72 is supported by a plate 74 secured to the foot 2 of the main bed frame.

These inlet and outlet pipes and seals are so positioned that they will be in proper register when the rotary member 15 is in closed or operative position.

The various heat lamps, air ventilator and air conditioning apparatus are all operated and controlled electrically and automatically, and in all forms of the bed construction the same type of automatic electric switch devices are used.

Figure 6:
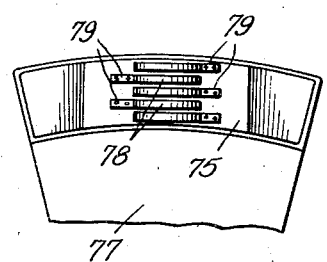
Figure 6 is an enlarged detail view in elevation of the stationary part of the wiper switch.
Figure 13:
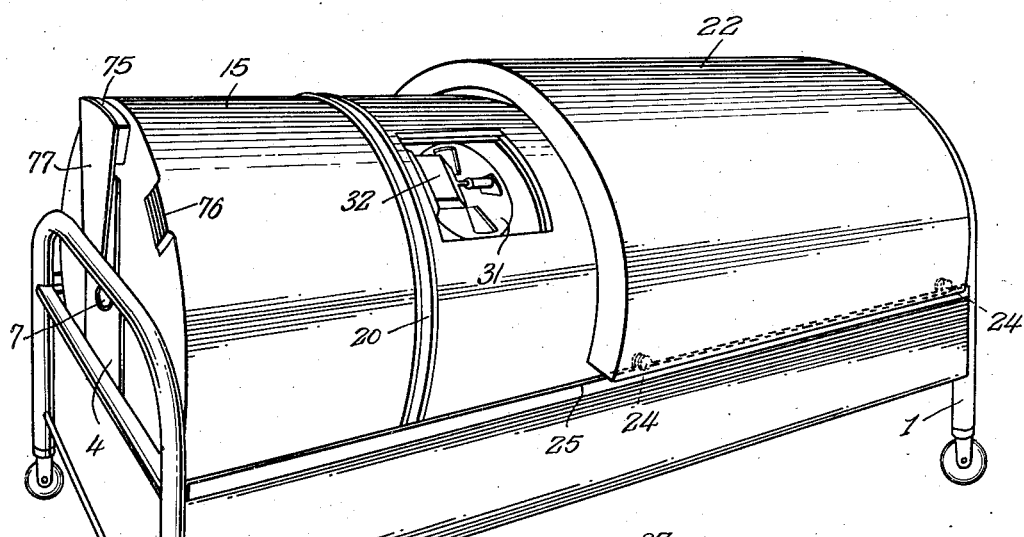
Figure 13 is a rear end perspective view of the bed in nearly closed position.

This automatic switch is shown in detail in Figures 4, 5 and 6 and comprises a stationary part 75 and a movable part 76 said parts adapted to be in engagement when the enclosure is in operative position.

Referring to Figures 1 and 2 the stationary part 75 of the switch is secured to a plate or the like 77 rigidly attached to the foot 2 of the main bed frame and the cooperating part 76 is mounted in the upper edge of the rotary member 15, said parts being in position to engage each other to establish contact when the rotary member is in closed or operative position.

Referring particularly to Figure 6 the stationary part 75 of the switch device comprises a series of curved spring contact fingers 78 properly insulated from the stationary plate 77 and from each other and each spring finger 78 is provided with a binding post or the like 79 for the wiring connections of the different circuits required.

Referring to Figures 4 and 5 the movable part 76 of the switch device comprises a base plate 80 having secured thereto a series of contact plates or strips 81, electrically insulated from one another. Associated with the base plate 80 is a hollow receptacle 82 adapted to be embedded in the end of the hollow walled rotary member 15, said receptacle forming a junction box for the wiring of the various circuits embedded in the rotary enclosure. Also contained within the receptacle 82 are two mercury tube switches 83 and 84, said switches being so arranged and connected in the circuit as to automatically break all circuits when the rotary enclosure is rotated to inoperative position, or conversely, the circuits are not established until the rotary cylinder is in its completely closed or operative position. These mercury tube switches are shown diagrammatically in the circuit, in Figure 1.

Figure 14:
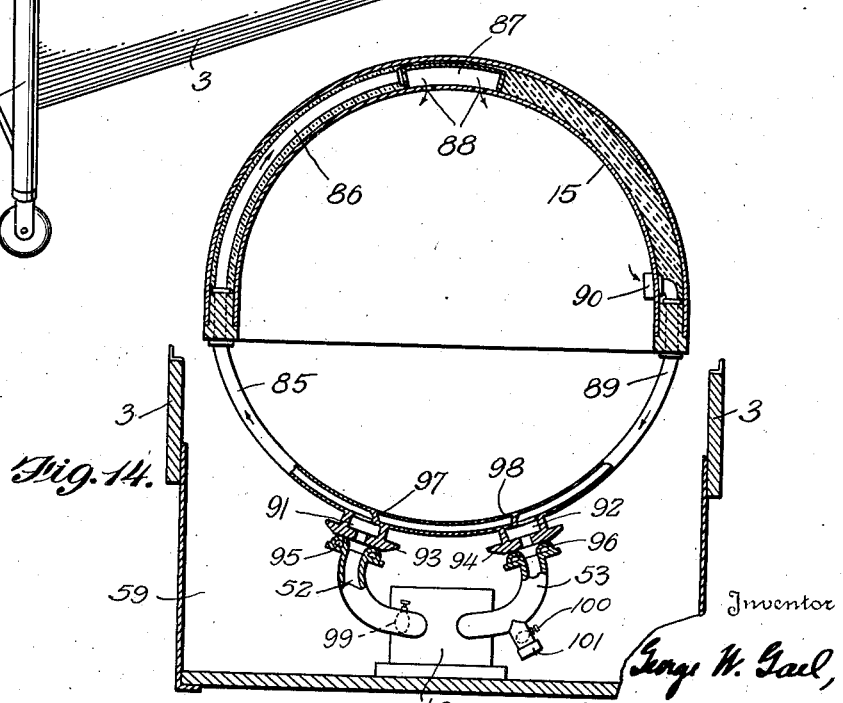
Figure 14 is a transverse sectional view showing another modification involving a different construction of rotary member with means for admitting and exhausting conditioned air.

Figure 14 illustrates another modification involving the admitting and exhausting of the conditioned air wherein the rotary member 15 is provided with a substantially annular duct 85 extending up between the walls of said rotary member as at 86 and communicating with a box like compartment 87 provided with outlet openings 88 through which the conditioned air is discharged into the interior of the bed. The opposite end of the duct 85 is curved downwardly and upwardly and enters the other side of the rotary member as at 89 and communicates with the interior of said rotary member at 90 through which the air is exhausted from said enclosure during the cycle of operation of the air conditioning apparatus. This annular duct 85 is preferably positioned at the intermediate portion of the rotary member 15, adjacent the annular track 20, (Figs. 1 and 2) and for structural reasons may be rigidly secured to said track.

The lower portion of said duct 85 is formed with inlet and outlet openings 91 and 92 respectively, said openings being provided with wiper-seal seats 93 and 94 adapted to cooperate with wiper-seals 95 and 96 respectively, when the rotary member 15 is in closed or operative position, which is the position shown in Figure 14. The wiper-seal 95 is carried by the discharge duct 52 of the evaporator chamber 49 of the air conditioning apparatus and the wiper-seal 96 is carried by the intake duct 53 of said evaporator chamber. Adjacent the openings 91 and 92 are arranged baffles 97 and 98 for properly deflecting the air in an obvious manner.

The ducts 52 and 53 may be provided with regulating dampers 99 and 100 for making the proper adjustments, but after the desired adjustment is obtained, these dampers are locked in such adjustment. In the event it is not desired to recirculate the air, but to take in fresh air from outside the bed, the damper 100 is opened (at least part way) and the desired regulation is obtained by the damper 99. Of course, it is not necessary to regulate these dampers continually as the thermostats take care of the usual regulation automatically. Moreover the damper 100 is really not needed, unless it is desired to recirculate only a part of the air. An airtight cap 101 is shown, and would be used when recirculating from the bed and is added to prevent leakage around the damper 100.

Although the above description is referred to as a so called modification this construction has certain advantages over those shown in Figures 1, 2, 9, 10 and 11 in that, in this latter construction the various ducts and air connections are concealed beneath the bed. Moreover the various communicating ducts can be made shorter and where the air conditioning apparatus is supported beneath the bed the mounting and supporting of these ducts is greatly simplified.

A still further modification of the rotary member 15 is illustrated in Figures 15 and 16. In this construction the stationary foot board 9 and the foot panel 16 of the rotary member 15 as shown in Figures 1 and 2, are replaced by a single stationary hollow foot panel 102, the member 15 rotating around this foot panel 102 on roller bearings 103 carried by the outer circumference of the said foot panel. An air seal 104 is also provided between the periphery of panel 102 and inner surface of rotary member, forming approximately a semi-circle, as it extends to a level a little below the top of mattress. With this arrangement the air ducts 52 and 53 may be rigidly secured to the foot panel 102, the air entering at the top at 105 and exhausting at 106 as clearly shown in Figures 15 and 16.

In this construction the rotary member 15 is provided with an arcuate band or rim extension 107 to which is secured a counterbalance weight 108, this band 107 also forming a lower track for the roller bearings 103. It is to be understood that the hollow foot panel 102 is filled with insulation material and is adapted to receive also the wiring for the automatic electric control devices the same as the stationary foot panel 9 illustrated in Figures 1 and 2. The modified foot panel 102 is also provided with a hinged or removable plate 109 in order to have access to the interior of the foot panel when desired.

In all forms of the device substantially the same system of electric wiring for the automatic control is employed, together with the same form of switch mechanism hereinbefore described.

Referring to Figures 1 and 2 and particularly to Figure 1 the main line wires L'—L² enter a switch box (a), at the head 1 of the bed, provided with a removable cover plate (b). In this switch box (a) are arranged two manually operated switches (c) and (d). One of these switches is adapted to cut off everything when open, whereas the other cuts off only the lamps or heaters, allowing the ventilator or air conditioning unit to remain operative. During the operation of the bed however this is done automatically by the two thermostats (e) and (f) mounted inside the bed on the stationary foot panel 9, the switches (c) and (d) remaining closed, these switches being provided in case they may be desired and acting as master switches.

Running from the master switches (c) and (d) are three wires (g), (h) and (i), the same being housed within the conduit (k) leading to the hollow foot end hanger or panel 9, said wires passing within the panel 9. In the drawings these wires are shown diagrammatically to avoid confusion in the drawings, but in actual practice the wires will be properly housed within the bed structure. This foot panel is not only hollow but is made of fireproof materials. All three wires pass upwardly inside the foot panel, two of them passing directly through the hollow axle 7 to be connected to the proper wiper-switch finger of the stationary part 75 of the wiper-switch device supported by the foot 2 of the bed frame, and the third wire passing (still within the foot panel 9) to the lamp or heater-control thermostat (f). From the other side of this thermostat the wiring continues back down the inside of the foot panel, through the axle 7 and then to its proper wiper-switch finger. Wiper switch fingers three and four (counting from top to bottom) are connected by a loop to the ventilator control thermostat (e), via the axle 7 and inside of foot panel 9.

This then brings all the lines to the wiper-switch fingers of the stationary part 75, which fingers are all insulated from each other. Finger number three is energized indirectly from finger number five via the two mercury tube switches 83 and 84. Number three will then energize number four when the mercury tube switches are closed, and as hereinbefore described these mercury switches are only closed when the rotary member 15 of the bed is in closed or operative position. In the drawings, Figure 1, these switches are shown diagrammatically but in actual practice they are rigidly mounted in the rotary member 15 and controlled automatically thereby. These switches provide an automatic means for cutting off all current to the lamps and motor whenever the rotary member 15 is rotated enough to allow the mercury in one or the other of said switches, to flow to the "off" end of the switch tube.

The wires leading from the segments to the various parts mounted on the rotary member 15 are all enclosed between the walls of said rotary member and the method of connecting the wires may be varied without changing the electrical relationship.

It is believed for the purpose of this invention it is not necessary to describe in detail the wiring of the various heating and control devices as these circuits can be easily traced.

Referring to Fig. 2 the same general system of wiring is carried out and the same type of wiper switch is used and mounted in the same manner as that shown in Fig. 1, except that in place of the ventilator control thermostat there is substituted a thermostat for controlling the air conditioning apparatus, the ventilator being eliminated and only three wiper switch fingers and three mating segments are required.

In connection with the air conditioning feature of the bed, where the beds are located comparatively near each other, as in hospitals, one central air conditioning unit could supply air to all the beds, thus eliminating all noise in the bedrooms. In such case, the warming arrangement would remain the same, each bed being provided with its own lamp or heater thermostat and the other thermostat could be made to operate an electric valve controlling the amount of conditioned air to be admitted to the bed.

What I claim is:

1. In a bed, the combination with a rectangular mattress supporting frame, of a semi-cylindrical insulated enclosure associated therewith, said enclosure comprising a rotatable portion and a sliding portion and horizontally arranged guideways carried by the frame for operatively supporting said sliding section.

2. In a bed, the combination with a rectangular mattress and supporting frame, of a semi-cylindrical insulated enclosure associated therewith, said enclosure comprising a rotatable portion and a sliding portion telescoping with the rotatable portion, air tight seals between said telescoping portions, air tight seals between said rotatable portion and said mattress, and horizontally arranged guideways carried by the frame for operatively supporting said sliding section.

3. In a bed, the combination with a rectangular mattress and supporting frame, of a stationary foot board carried by said frame, a semi-cylindrical insulated enclosure associated therewith, said enclosure comprising a rotatable portion and a sliding portion telescoping therewith, an air tight seal between said telescoping portions, air tight seals between said telescoping portions and said mattress, and an air tight seal between the stationary foot board of the mattress frame and the rotatable section.

4. In a bed, the combination with a bed frame comprising head, foot and side rail members, of a rectangular mattress supporting frame, a semi-cylindrical insulated enclosure for said bed, said enclosure including a rotatable portion having a closed end adjacent the foot of said bed frame, a hollow stationary foot board carried by the mattress supporting frame within the enclosure adjacent said closed end of the rotatable portion, inlet and outlet air openings provided in said hollow foot board and inlet and outlet conduits communicating with said inlet and outlet air openings, said conduits being adapted to connect with an air conditioning apparatus.

5. In a bed, the combination with a bed frame comprising head, foot and side rail members, of a rectangular mattress supporting frame, an insulated semi-cylindrical rotary enclosure for said bed, a closed end for the rotatable enclosure adjacent the foot of the bed frame, a hollow stationary foot board carried by the mattress supporting frame within the enclosure, an air seal between said hollow foot board and rotary enclosure, a tubular member secured to the foot of the bed frame providing a stationary support for the said foot board and also a means for rotatably supporting the closed end of said rotary enclosure, and means for admitting cooled air and exhausting warm air through said hollow foot board and tubular support said means being adapted to communicate with an air conditioning apparatus.

GEORGE W. GAIL.